Aug. 20, 1940.　　　G. P. ANDERSON ET AL　　　2,211,842
FOOD GRINDER
Filed Feb. 17, 1938　　　2 Sheets-Sheet 1
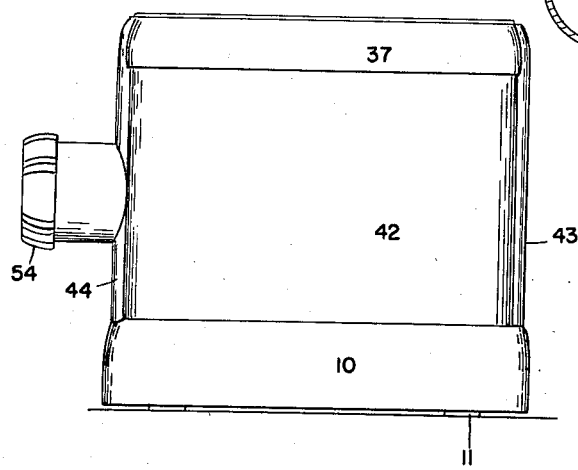
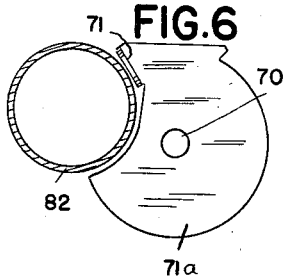
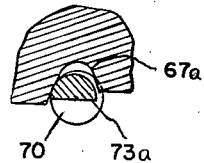
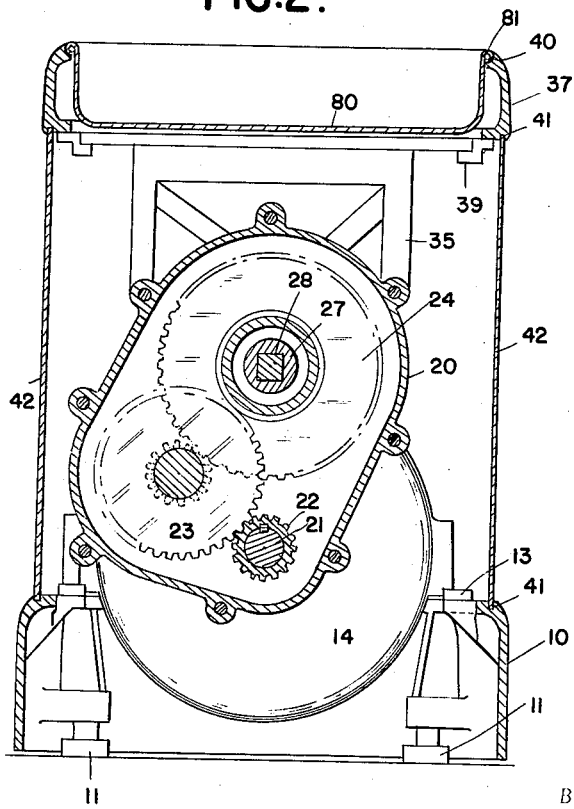
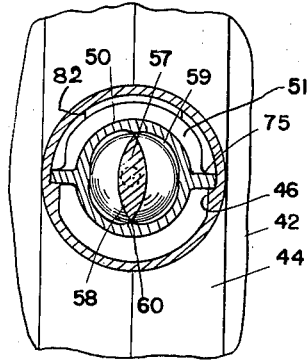
INVENTORS
GEORGE P. ANDERSON
DOUGLAS G. ANDERSON
BY
ATTORNEYS Aug. 20, 1940.  G. P. ANDERSON ET AL  2,211,842

FOOD GRINDER

Filed Feb. 17, 1938  2 Sheets-Sheet 2

INVENTORS
GEORGE P. ANDERSON
DOUGLAS G. ANDERSON
BY
ATTORNEYS

Patented Aug. 20, 1940

2,211,842

UNITED STATES PATENT OFFICE 2,211,842

FOOD GRINDER

George P. Anderson and Douglas G. Anderson, Detroit, Mich., assignors to The Standard Computing Scale Company, Detroit, Mich., a corporation of Michigan Application February 17, 1938, Serial No. 191,054

4 Claims. (Cl. 146—182)

The present invention relates to food grinders and more particularly to power operated choppers of the kind commonly to be found in meat markets, butcher shops and the like.

Food choppers of this kind usually consist of a power unit, including an electric motor, a bowl unit, the latter being the grinding or chopping device, and a pan, from which the pieces of meat or other food are fed to the bowl. The pan is usually mounted on the bowl and the bowl is usually arranged to be detachable from the power unit to permit its being placed in a refrigerator or for ease of cleaning.

Among the objects of the present invention is a power operated chopper which shall include these several elements all in a single compact unit and not only retain the advantages of each, but shall have certain additional advantages.

Another object is to arrange the parts in a single unit in which the bowl and motor are substantially completely housed with the meat pan supported by and upon the housing.

Another object is to improve the appearance of the unitary assembly by so arranging the elements that they are substantially entirely housed, the only projecting part being the delivery end of the bowl.

Figure 4:
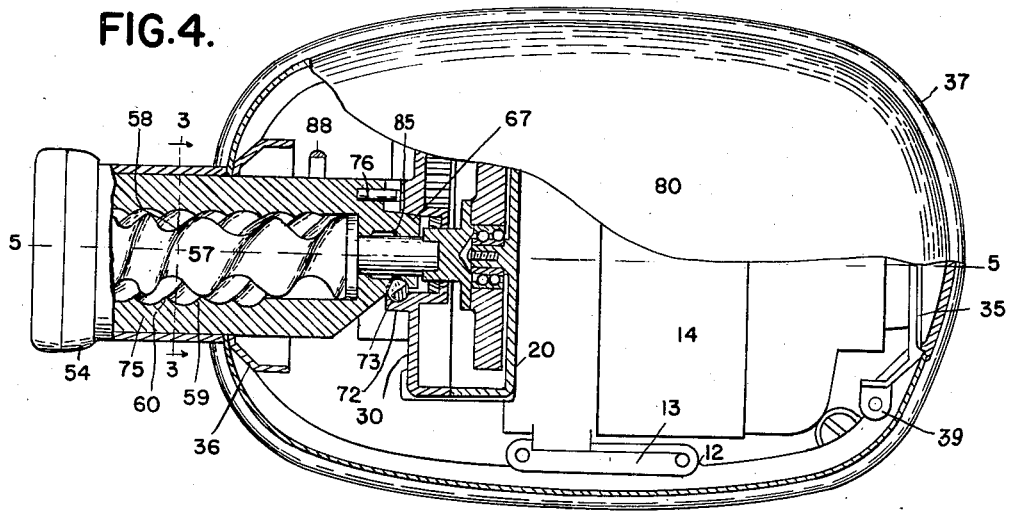
Figure 5:
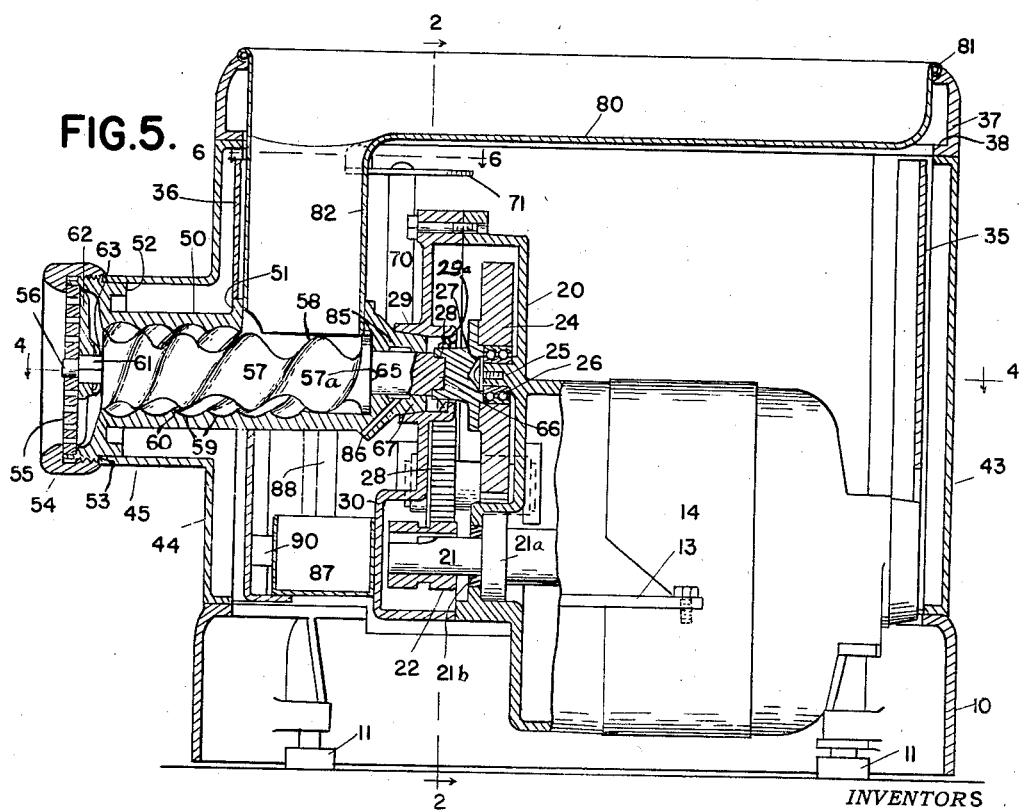

Other objects and advantages will readily appear to those skilled in the art upon reference to the following description and the accompanying drawings in which:

Figure 1 is a view in elevation of the unit.
Figure 2 is a section on line 2—2 of Fig. 5.
Figure 3 is a section on line 3—3 of Fig. 4.
Figure 4 is a section on line 4—4 of Fig. 5.
Figure 5 is a section on line 5—5 of Fig. 4.
Figure 6 is a section on line 6—6 of Fig. 5.
Figuse 7 is an enlarged detail in section of the locking means.

As indicated, the unit comprises a base 10 provided with a plurality of adjustable feet 11, by means of which the device may be leveled, and also provided with suitable pads 12 upon which may be fixed the supporting feet 13, forming part of the housing of an electric motor 14.

Attached to the end of the motor 14 is a gear case 20 into which extends the motor shaft 21 carrying a small spur gear 22 keyed thereto. This gear 22 meshes with the next reducing gear 23, which in turn meshes with and drives the larger gear 24 mounted upon the stud 25 and provided with a combined radial and thrust ball bearing 26. This latter gear 24 is provided with a large hub member 27 fixed thereto and having in its end a square or other polygonal socket 28 which member extends through a suitable opening in the bottom of a large socket 29 formed in the cover 30 of the gear case and arranged in axial alignment with the gear 24 and hub 27, and is surrounded by an oil seal 29a.

Also fixed to the base 10 is a pair of upright frame members 35 and 36, the one 35 being at the rear end and the other at the front and provided with an open portion through which extends the chopper bowl.

Upon the upper ends of the frame members 35 and 36 is a moulding 37 having a lower inturned flange 38, by means of which it may be secured to lugs 39 on the members 35 and 36, while the upper edge is curved inwardly and provided with a seat 40 for the edge of the meat pan.

As indicated in Figure 2, the base 10 and moulding 37 are provided with grooves 41 in which are seated the edges of the sheet metal side panels 42. And at each end are shown upright moulding members 43 and 44, one of which, molding 44, is provided with an opening and outwardly directed tubular portion or flange 45, serving to support and house the projecting end of the chopper bowl.

The tubular flange 45, forming part of moulding 44, may be provided interiorly with longitudinal shoulders 46 (see Fig. 3) serving as slides and temporary support for the chopper bowl when the latter is being inserted or removed.

An alternative arrangement is to dispense with the tubular flange, 45, leaving an opening in the molding, 44, into which the feeding chamber portion or the bowl is inserted, the bowl being guided or supported by suitable means on the moulding, 44, and/or the upright member 36.

The chopper bowl, designated as a whole at 50, is substantially cylindrical and has instead of the usual vertically extending feed throat, a short upstanding flange 51. At the discharge end, in the arrangement shown, the bowl is provided with a cylindrical enlargement 52 adapted to fit snugly into the open end of tubular flange 45, when the bowl 50 is in operating position.

The projecting portion of the bowl 50 is threaded for the reception of the nut 54 which secures in place, against an internal shoulder 53, in the bowl, the perforated plate 55, which plate is preferably of somewhat larger diameter than the diameter of the screw 57 but may be of conventional form with the central opening for the small shaft portion 56 of the conveyor screw 57.

The conveyor screw 57 is preferably of the novel form illustrated, in that it is double-threaded throughout its length, and that it has a substantially uniform lead thread 58 or channel for the greater portion of its length, this being substantially the same as the lead of grooves 59 in the inner wall of the bowl. Near the discharge end, however, it is preferred to decrease the lead somewhat and at the same time decrease the depth of the channels.

In right cross-section, as in Figure 3, the portions of the bowl and the conveyor screw in contact with the food are bounded by approximately circular arcs. This results in a practical minimum of surface friction for the given depths of grooves and a given quantity of food passed, and with other independent factors remaining constant.

The threads in both bowl and conveyor screw are preferably comparatively sharp, differing from the conventional form, in which the threads have wide machined faces on their tops.

Screw 57 extends to near the plate 55 and is provided with a reduced squared portion 61 receiving and driving a knife 62 of conventional form, and also a spring washer 63 which serves to maintain the knife 62 in close contact with the plate 55. The drive end of the screw 57 is, as shown, a reduced shaft portion 65 having a bearing in the end of bowl 50 and projecting a short distance therefrom, having its end 66 squared or of other polygonal shape to fit the recess 28 in hub member 27.

The bowl 50, in addition to the features already mentioned, is also to be reduced somewhat at its inner end as at 67 so as to fit into the socket 29 formed in gear box cover 30 and the parts so proportioned that, when the bowl 50 is in place, the portion 67 is in the socket 29 and the end 66 of the screw is in the socket 28, the end of part 66 abutting the bottom of the socket 28 in such fashion as to move the screw 57 in the bowl longitudinally toward plate 55 compressing slightly spring 63 and lifting the shoulder 57a slightly from the adjacent wall of the bowl. By so proportioning these parts, when the bowl is removed, the knife 62 remains tightly pressed against plate 55 and shoulder 57a immediately abuts the end wall, these being due to the action of spring 63.

When in operating position, the parts are locked in position by the locking means shown in Figures 4 and 5 which consists of a vertical shaft 70, provided at its upper end with a suitable handle 71, which shaft is mounted for rotation in a boss or enlargement 72 on socket 29 and is so arranged as to cross the path of the bowl end 67 when moved into or out of the socket. At the point where the shaft crosses the interior of the socket it is cut away as indicated at 73 and so cut away as to provide a slight eccentricity of the remaining part of the shaft, and at a corresponding point on the periphery of part 67 of the bowl is cut a tangentially arranged notch 67a against the sides of which the eccentric portion 73a of the shaft works.

This arrangement permits rotation of the shaft so that the cut away portion will allow the bowl end to be moved into or out of the socket 29, but when rotated into the position indicated in Figure 4, the bowl is securely locked in place and also locked against rotation. The slight eccentricity of the locking portion 73 of the shaft 70 is so arranged that when being rotated into the locked position, it pulls the bowl back, against the pressure of spring 63, and in its initial movement toward unlocked position it moves the bowl outwardly.

Bowl 50 is also provided with longitudinal ribs 75 coacting with shoulders 46 in tube 45 for guiding the bowl during insertion or removal and may or may not be provided with a pin 76 for piloting the bowl to its proper radial position.

It is preferred also to make the handle 71 as a plate 71a so shaped as to prevent insertion of the food pan, about to be described, until the bowl has been locked.

The food pan 80 consists of a shallow pan of such size and shape as to fit within and rest its upper, preferably beaded, edge 81 upon the upper moulding 37 (see Fig. 5). At one end the bottom of the pan is provided with a tubular downwardly arranged throat 82 of such size and sufficient length to extend into and fit the upright flange 51 on the bowl 50.

Any meat juices passing from the interior of the bowl 50 along the screw shaft 65 are prevented from getting into the gear case by the provision of an internal annular groove 85 in the bowl portion 67, which groove is provided with a drain 86 leading to a point above a removable cup 87. The latter may be provided with a suitable handle 88 extending well up toward the pan 80, and with a spring clip 90 on its side to secure it in place under the drain 86.

What we claim is:

1. In a food chopper and power unit, a housing containing a motor and provided with a horizontally projecting tubular portion, a chopper bowl adapted to slide into said tubular portion and means for connecting said bowl to said motor in operating relation, said chopper bowl being substantially cylindrical and having a feed opening surrounded by a short vertical flange and provided at its outer end with an enlarged portion adapted to fit within and be supported by said projecting tubular portion, and a food pan having a tubular throat adapted to fit within said flange.

2. A power operated food chopper, comprising a housing having substantially vertical walls and open at the top, a motor and chopper bowl within said housing, and a food pan supported by said walls and forming a cover for said housing and a tubular throat member extending from the pan into said housing and opening into said bowl, and means for locking together in operative relation said chopper bowl and motor, said locking means having a portion preventing the application of said pan when said chopper bowl and motor are in unlocked relation.

3. A power operated food chopper, comprising a housing, a motor within said housing, a chopper bowl assembly, and a food pan supported by said housing and forming a cover thereof, and a tubular throat member extending from the pan and opening into the bowl, and means for locking together in operative relation said chopper bowl and motor, said locking means having a portion preventing the application of said pan when said chopper bowl and motor are in unlocked relation.

4. In a food chopper and power unit, a housing containing a motor and provided with a horizontally projecting tubular portion, a chopper bowl adapted to slide into said tubular portion and means for connecting said bowl to said motor in operating relation, said chopper bowl having a feed opening surrounded by a short vertical flange and provided at its outer end with a portion adapted to fit within and be supported by said projecting tubular portion, and a food pan having a tubular throat adapted to fit within said flange.

GEORGE P. ANDERSON.
DOUGLAS G. ANDERSON.